No. 638,295. Patented Dec. 5, 1899.
C. A. STUDLE.
PLANTER AND FERTILIZER DISTRIBUTER.
(Application filed Sept. 6, 1899.)
(No Model.) 2 Sheets—Sheet 1.
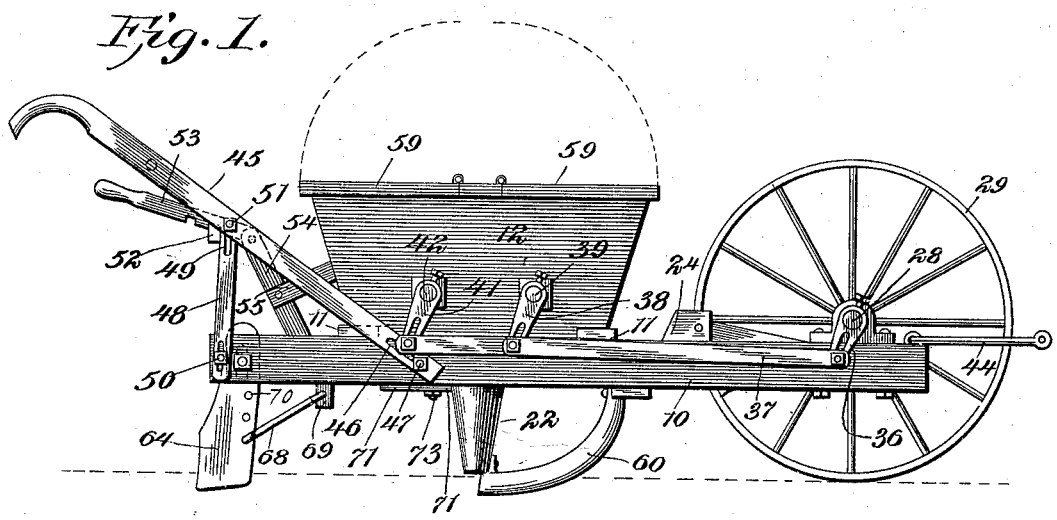
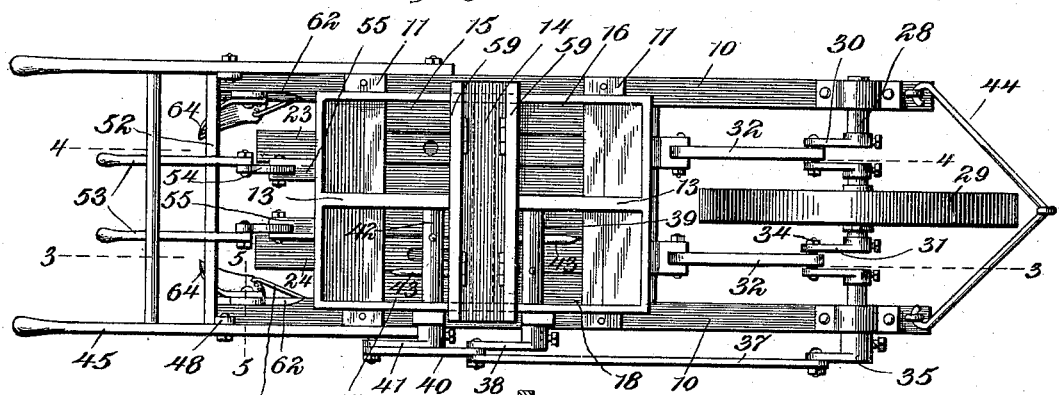
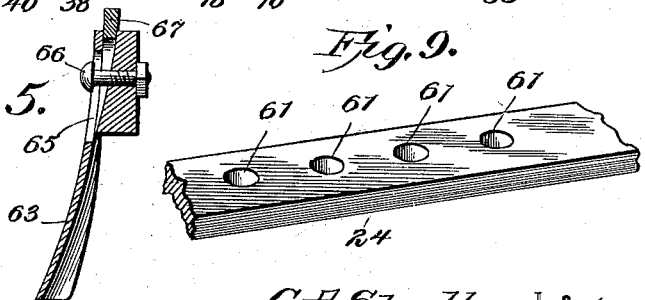
Witnesses
Howard D. Orr.
Chas. S. Hoyer.
C. A. Studle, Inventor.
By his Attorneys,
C. A. Snow & Co.

No. 638,295. Patented Dec. 5, 1899.
C. A. STUDLE.
PLANTER AND FERTILIZER DISTRIBUTER.
(Application filed Sept. 6, 1899.)
(No Model.) 2 Sheets—Sheet 2.
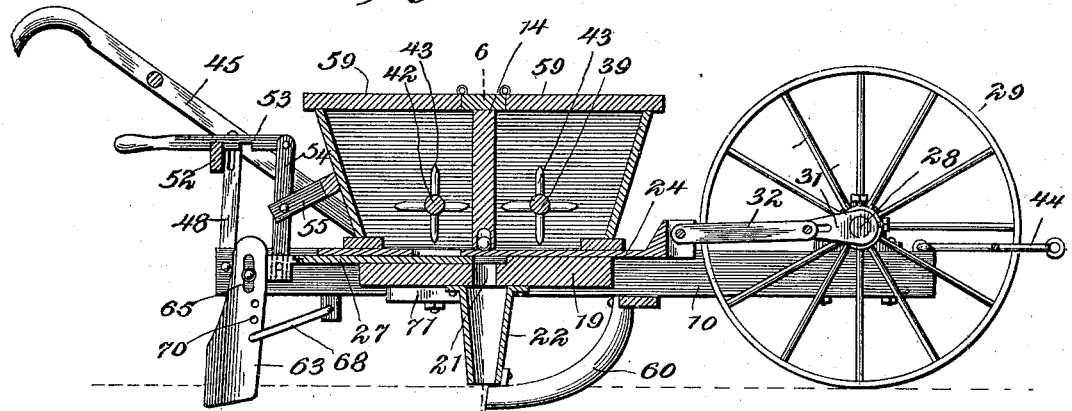
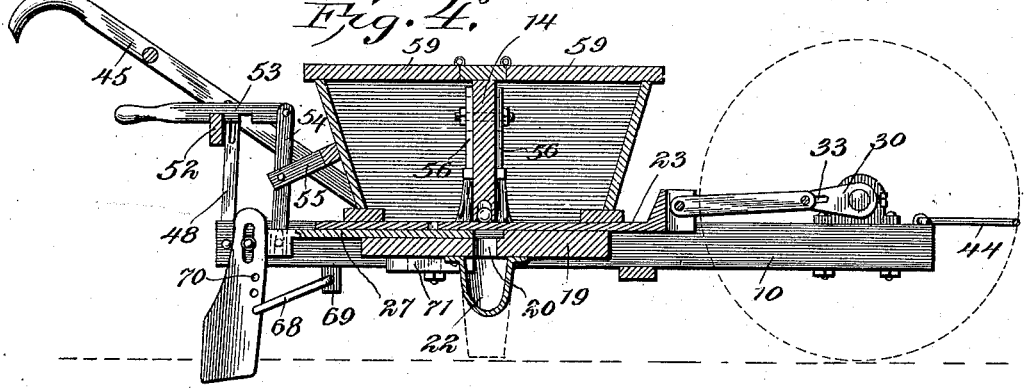
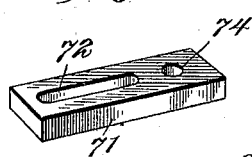
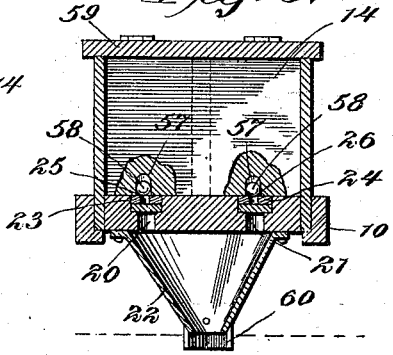
Witnesses
Howard D. Orr
Chas. S. Hyer
C. A. Studle, Inventor.
By his Attorneys,
C. A. Snow & Co.

UNITED STATES PATENT OFFICE.

CHARLEY A. STUDLE, OF HAYS, KENTUCKY, ASSIGNOR OF ONE-HALF TO CORNELIUS MORRISON, OF SAME PLACE.

PLANTER AND FERTILIZER-DISTRIBUTER.

SPECIFICATION forming part of Letters Patent No. 638,295, dated December 5, 1899.

Application filed September 6, 1899. Serial No. 729,615. (No model.)

*To all whom it may concern:*

Be it known that I, CHARLEY A. STUDLE, a citizen of the United States, residing at Hays, in the county of Warren and State of Kentucky, have invented a new and useful Planter and Fertilizer-Distributer, of which the following is a specification.

This invention relates to a combined planter and fertilizer-distributer having the characteristics of a drill, and has for its object to provide a simple, compact, and efficient device of this nature which is adjustable and primarily arranged to either sow the grain and fertilizer in furrows or to drop the seed in hills any desired distances apart and at the same time drop the fertilizer in the hill with the seed and economically distribute the fertilizer by avoiding a deposit of the same in the spaces between the hills, the several parts being operated without the use of belt-wheels and belts and having actuating devices directly in connection therewith to thus prevent the loss of motion and also employ means which are easily adjustable to vary the speed of the grain and seed planting mechanism as well as the fertilizer-distributing devices.

Other objects and advantages will be disclosed in the subjoined description and the novelty hereinafter claimed, a preferred embodiment of the invention being illustrated in the accompanying drawings, wherein—

Figure 1 is a side elevation of a machine embodying the invention. Fig. 2 is a top plan view of the machine, showing the lids of the grain or seed and fertilizer boxes in elevated position or open. Fig. 3 is a longitudinal vertical section on the line 3 3 of Fig. 2. Fig. 4 is a similar section on the line 4 4 of Fig. 2. Fig. 5 is a section on the line 5 5 of Fig. 2. Fig. 6 is a transverse vertical section on the line 6 6 of Fig. 3. Fig. 7 is a detail perspective view of the pea-regulating slide. Fig. 8 is a detail perspective view of one of the brushes or cleaners for the slides. Fig. 9 is a detail perspective view of a part of a slide of a different form.

Similar numerals of reference are employed to indicate corresponding parts in the several views.

The numeral 10 designates opposite longitudinal side bars of the bed-frame which are arranged in parallel relation and preferably of equal length and have near their rear portion cross-supports 11, which are partially let into the lower portion of opposite ends of a box or receptacle 12. This box or receptacle 12 is centrally divided by a longitudinal partition or partitions 13, intersected by a transverse central partition 14, to form seedboxes 15 and 16 and fertilizer-boxes 17 and 18, the seedboxes being on the left-hand side of the machine, as shown, and the fertilizer-boxes directly opposite. The box or receptacle has a bottom 19, which depends below the upper edges of the bars 10 and directly under the partition 14. The said bottom has opposite outlet-openings 20 and 21, one opening serving for each pair of boxes and both leading through a discharge-spout 22 of flat tubular form and disposed transversely under the said bottom. Moving over the said openings 20 and 21 are slides 23 and 24, which are seated in such manner as to bring their upper surfaces flush with the top surface of the bottom 19 within the boxes. The slides 23 and 24 will have therein for ordinary purposes feed-openings 25 and 26, one in each; but the grain and seed slide 25 is subject to variation in this particular, as will be more fully hereinafter described. The slides 25 and 26 are reciprocable entirely through the boxes from end to end in a longitudinal direction, and the openings 20 and 21 are controlled, as to their outlet, by damper-slides 27, which are movable against a part of the under surfaces of the slides 23 and 24 and far enough forward to cover the outlet-openings 20 and 21.

The slides 23 and 24 are operated by a transversely-disposed crank-shaft 28, journaled on the front extremities of the bars 10 and actuated by a ground-wheel 29, which may be provided with suitable traction projections. On opposite sides of the wheel 29 the shaft 28 has pairs of contiguously-arranged crank-arms 30 and 31, which have a similar direction in order to simultaneously move the slides 23 and 24 in like directions and equally. The crank-arms 30 and 31 are connected to the front terminals of the slides 23 and 24 by links 32, and to vary the stroke of the slides the said arms are formed with slots 33 to adjustably receive a clamping or other bolt 34, which connects the front ends of the links and affords convenient means for changing the position of the said links at will for the purpose stated. One end of the shaft 28 is projected and has fast thereon a crank-arm 35, also slotted, as at 36, and adjustably connected thereto is the front end of a pitman 37, which is extended rearwardly and adjustably secured to a slotted crank-arm 38, fast on the projected end of an agitator-shaft 39, located in the forward fertilizer-box 18. The said crank-arm 38 is also connected by a link 40 to a rear slotted crank-arm 41, similarly fixed to the projected end of an agitator-shaft 42 in the rear fertilizer-box. The shafts 39 and 42 are provided with radially-extending agitating-fingers 43 thereon, which have the obvious operation of stirring up the fertilizing material and assisting in the feed of the same by preventing clogging or packing in the bottom portions of the boxes 17 and 18 over the slide 24. It will be observed that the motion of the shafts 39 and 42 can also be varied by adjusting the pitman 37 and link 40.

To the front ends of the bars 10 a draft-rod 44 is movably attached in advance of the ground-wheel 29, and to the rear outer portion of said bars 10 handles 45 are adjustably connected by having their front extremities slotted, as at 46, and held in place by clamping-bolts 47. The said handles are also adjustable as to their angle relatively to the bars 10 through the medium of uprights 48, having their opposite extremities slotted, as at 49, and held in adjustable relation, respectively, with the bars 10 and the handles by bolts 50 and 51. A cross-brace 52 also connects the handles through the medium of the uprights, to which it is directly secured, and also serves as a resistance means for a notched lever 52, pivotally connected at its inner end to the upper terminal of a rocking bar 54, movably held by a fulcrum-support 55 and attached at its lower end to the slide 27. This mechanism is similar in connection with each slide, and it is preferred that only two notches be formed in each of the levers 53, so as to adjust the slides 27 entirely open or completely closed.

The front and rear end walls of the boxes 15, 16, 17, and 18 are inclined inwardly to direct the contents of said boxes toward a central point or in the direction of the partition 14, and in order to have the slides 23 and 24 feed from their boxes with regularity adjustable brushes 56 are employed and secured to opposite sides of the said partition 14 and have an obvious and well-known operation. In the lower edge of the partition 14, directly above the outlet-openings 20 and 21, seats 57 are formed, in which balls 58 have free movement and provide means for causing a force feed of the seed, grain, or fertilizer and prevent lodgment of the same within the openings 25 and 26. As the said openings 25 and 26 come under the balls 58 the latter gravitate thereinto and dislodge any seed, grain, or fertilizer that may have a tendency to stick, and thereby always keep the said slides in accurate working condition. The box or receptacle 12 is supplied with hinged lids or covers 59, which open inwardly, as indicated by Fig. 1, so as to conveniently expose all of the boxes for the purpose of replenishment or other manipulation. In front of the discharge-spout a furrow-opener and guide 60 is rigidly located and extends below the lower end of said spout and has the well-known function of holding the machine well in line relatively to the furrow or line of hills.

The slides, and particularly the slide 23, may be formed as shown in Fig. 9 and provided with a series of closely-arranged openings 61, which may be utilized for continuous sowing or deposit of the seed or material to be sown within the discharge-spout 22 with such rapidity as to establish a continuous flow from the outlet end of said spout. These openings 61 may also be at such relative distances apart as to accommodate close hill-planting, and in the slide 24 the openings or single opening, as the case may be, will be longer than those in the slide 23 in order to deposit a sufficient quantity of fertilizer within the spout 22 to produce the desired result in propagation.

The inner sides of the rear extremities of the bars 10 have beveled faces 62, as more clearly shown by Fig. 5, and thereto are adjustably secured rear coverers 63, having inwardly-deflected blades 64 and upper vertically-slotted shanks 65 to receive adjusting-bolts 66, which project through the adjacent portions of the bars 10. It is necessary at times to vary the inclination of the coverers 63, and for this purpose slotted wedges 67 are supplied and are interposed between the shanks 65 and the bars 10. In obtaining this adjustment the bolts 66 are first loosened and the wedges driven down until the coverers stand inward far enough, when said bolts will be again tightened. It is also required that the coverers penetrate the ground various distances, and for this purpose they are supplied with the slotted shanks and are held against movement by forward braces 68, movably attached to pendents 69 from the bars 10 and adapted to be adjusted in a series of openings 70 in the coverers adjacent their front edges and at a suitable elevation. It will be observed that these braces are in advance of the coverers, and the pull against the latter will be in the same direction. It is therefore obvious that having the said braces positioned as stated the coverers will not be affected by a drag and will be maintained in their desired adjusted positions.

Directly under the outlet-opening 20 a pea-sowing-controlling slide 71 is adjustably attached and is of the form shown in detail by Fig. 7. This slide 71 has an elongated slot 72 therein, through which extends an adjusting-bolt 73, and in advance of the slot 72 is a feed-opening 74, which is large enough to permit a single pea to pass therethrough, and thus avoid dropping a number into a hill when one will equally well answer the purpose. When not in use, this slide 71 may be moved back out of the way and the outlet-opening 20 left clear for other uses.

As before indicated, and clearly shown by the drawings, the slides 23 and 24 will have a simultaneous reciprocation or movement in the same direction equally and will deposit grain or seed and fertilizer in the discharge-spout 22 at the same time, which will afford means for economizing the use of fertilizer. The machine is intended to plant corn, stock-peas, beans, cotton, and other grains and can be used as a drill or simply as a hill-planter. By putting corn, for instance, in both boxes 15 and 16 the parts are so timed as to drop two hills to one revolution of the wheel 29, and if the corn is placed in only one box there will be only one hill dropped to each revolution of the said wheel. The fertilizer is fed from the boxes 17 and 18 on exactly the same principle, and another advantage in this separate box arrangement is that stock-peas can be placed in either one of the boxes 15 or 16 and corn in the other and the machine operate to plant one hill of corn and one of peas to each revolution of the wheel 29. At any time that the machine is transferred from one field to another the slides 27 can be closed, and at any time during the planting operation if a rich piece of ground be traversed that does not require fertilizer the feed of the latter may be easily shut off by the right-hand slide 27 and afterward easily allowed to feed into the spout 22 when poor ground is reached.

A further advantage of the present machine is that all sprocket-gearing, as well as other operative mechanism wherein motion is lost, is entirely dispensed with in the present arrangement, which will give a very much more effective result.

Another advantage is the fact that in sowing or planting certain grains of different kinds in opposite boxes it may be necessary to apply the fertilizer only to one grain or seed planted, and for this operation the openings in the seed or grain planting slide and fertilizer-slide may be reversely arranged or the fertilizer-slide so constructed as to only feed from one box.

Other advantages will appear from time to time to those using the device, and it is obviously apparent that changes in the form, proportions, and minor details of construction could be resorted to without in the least departing from the spirit or sacrificing any of the advantages of the invention.

Having thus described the invention, what is claimed as new is—

1. In a device of the character set forth, the combination with a box or receptacle divided into separate compartments by a longitudinally-disposed partition intersected by a transverse partition, thereby forming longitudinally-alined pairs of said compartments on opposite sides of the center, the said compartments having discharge-openings therefrom at their inner extremities adjacent the transverse partition, a single longitudinally-movable slide for each pair of compartments and adapted to feed from said pairs of compartments in alternation, a link connected to the front end of each slide and to the crank-arms of a driving-shaft in advance, both of the slides having an equal stroke in parallelism, a ground-wheel on the said shaft, a single feed-spout for both pairs of compartments having an upper extended width and converging to a lower central outlet, and means for shutting off the feed of one or both pairs of compartments.

2. In a device of the character set forth, the combination of opposite longitudinally-disposed bars having inner inclined faces at their rear extremities, planting devices operatively supported by the said bars, coverers adjustably applied to the inclined faces of the said bars, and wedges adapted to be inserted between the upper extremities of the coverers and the said faces of the bars.

3. In a device of the character set forth, the combination with opposite alined pairs of boxes separated from each other and having a single outlet-opening for each pair, controlling-slides for shutting off the outflow from the boxes, a single feeding-slide for each pair of boxes above the controlling-slide, a ground-wheel operating a front crank-shaft, crank-arms on opposite sides of the said ground-wheel and having the same direction, links connected to the front ends of the slides for feeding the contents of the boxes and also adjustably attached to the crank-arms, agitators in one pair of the boxes having crank-arms connected thereto, an outer crank-arm on the front crank-shaft, a pitman running from the outer crank-arm of the crank-shaft to the crank-arm of the front agitator, a link connecting the crank-arm of the front agitator with that of the rear agitator, means in advance of the ground-wheel for applying draft, a single discharge-spout for both openings, a furrow-opener in advance of the said discharge-spout, and rear coverers.

In testimony that I claim the foregoing as my own I have hereto affixed my signature in the presence of two witnesses.

CHARLEY A. STUDLE.

Witnesses:
J. M. RICHESON,
I. W. BARRICK.